March 1, 1927. 1,619,226
T. D. WERBITZKY
ROTARY VALVE FOR INTERNAL COMBUSTION ENGINES
Filed Feb. 9, 1925 2 Sheets-Sheet 1

Inventor
Theophilus D. Werbitzky
By O'Neill
Attorneys

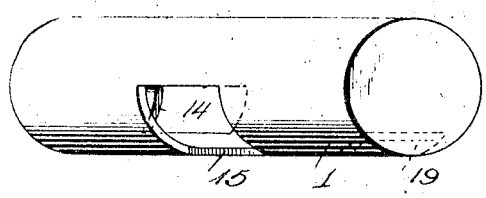
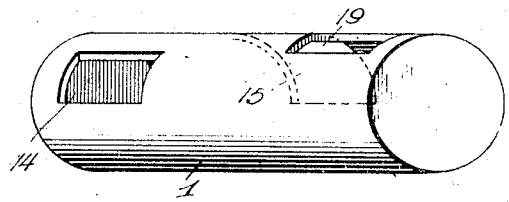
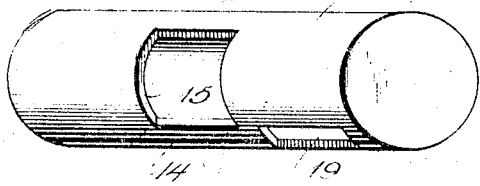
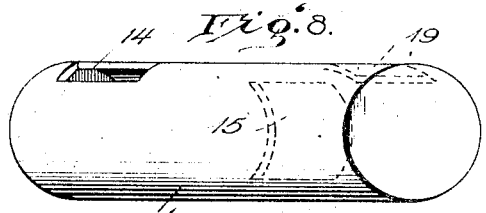
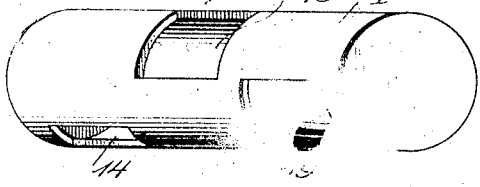
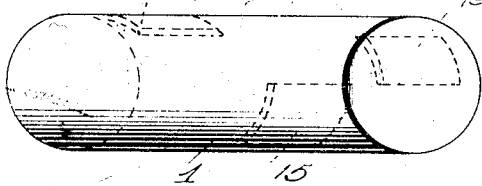
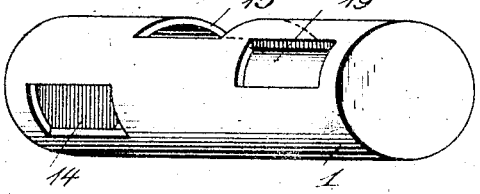
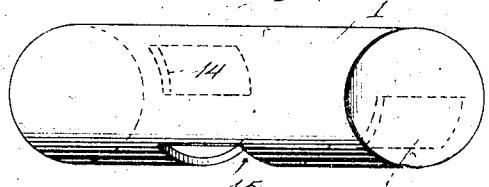

Patented Mar. 1, 1927.

1,619,226

UNITED STATES PATENT OFFICE.

THEOPHILUS D. WERBITZKY, OF CLEVELAND, OHIO.

ROTARY VALVE FOR INTERNAL-COMBUSTION ENGINES.

Application filed February 9, 1925. Serial No. 7,966.

This invention relates to new and useful improvements in rotary valves for internal combustion engines.

More specifically the invention relates to the provision of a rotary valve provided with ports so arranged with respect to cooperating ports through the valve casing, and the cylinder, that during the operation of the engine, cooling and scavenging air is passed through the valve during the second and third cycles (compression and expansion strokes) of operation, whereby to expel the excess gases therefrom and also operating to reduce the temperature of the valve.

As will hereinafter appear, the cooling and scavenging air which is passed through the valve is thereafter led to the carburetor. Obviously, during its passage through the heated valve, the temperature of the air is raised and it is led to the carburetor in such heated condition as adapts it to more ready vaporization.

The object of the invention therefore is the provision of rotary valve mechanisms and assembly which is economical from a standpoint of construction and assembly, and which is efficient in the accomplishment of the purposes as above set forth.

Other objects of the invention will be made apparent in the following specification, when read in connection with the accompanying drawings forming a part thereof.

In said drawings:

Fig. 3 is a perspective view showing the position of the valve during the first cycle of operation.

Fig. 4 is a similar view showing the position of the valve at the end of the first cycle and the beginning of the second.

Fig. 5 is a similar view of the valve during the second cycle.

Fig. 6 is a similar view of the valve at the end of the second cycle and the beginning of the third cycle.

Fig. 7 is a similar view of the valve during the third cycle.

Fig. 8 is a similar view of the valve at the end of the third cycle and at the beginning of the fourth cycle.

Fig. 9 is a similar view of the valve during the fourth cycle.

Fig. 10 is a similar view of the valve at the end of the fourth cycle and at the beginning of the first cycle.

Figure 2:
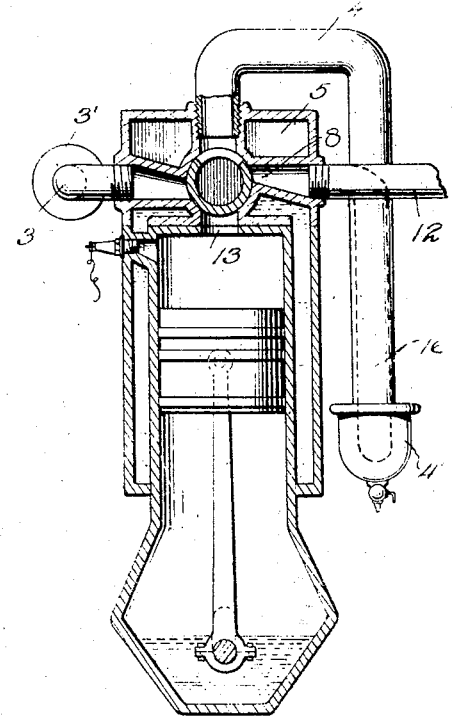
Fig. 2 is a similar view taken through a side of the engine.
Figure 11:
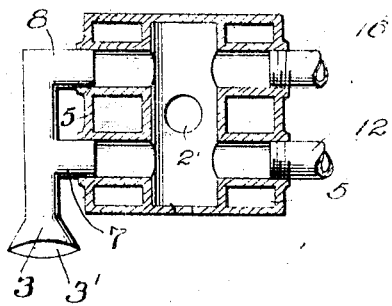
Fig. 11 is a cross-section taken through the valve casing, and showing the location of the intake and exhaust ports, and the air outlet and inlet.

Now referring specifically to the drawings, in which similar reference characters indicate like parts throughout the several views, A indicates the cylinder of an internal combustion engine, and 1 indicates my rotary valve mounted above the cylinder A, within a valve casing 2. The casing 2 is provided with an air inlet 3, having a flared opening 3' to trap the air and conduct it into the pipe 3, as will be clearly understood, and an outlet pipe 4 leads from a port 2', provided in the casing 2, to the carburetor 4'. The customary water jackets 5 surround the valve casing, and are connected to the radiator by the pipe 6. As illustrated in Figs. 2 and 11, the air inlet 3 leads to an exhaust port 7 in the valve casing, and an air inlet 8 leads to the intake valve port 2'.

The valve 1 may be rotated by properly synchronized devices connected to the motor. I have here illustrated the valve as equipped with a shaft 9 extending through the casing 2, and carrying a beveled gear 9' at its end, in mesh with a co-operating beveled gear 10' carried by the upper end of a rotatable shaft 10. The shaft 10 extends through suitable bearing brackets supported by the motor and is provided with a gear 10² at its lower end in mesh with a co-operating gear 11' secured to the crank shaft 11 of the engine.

Figure 1:
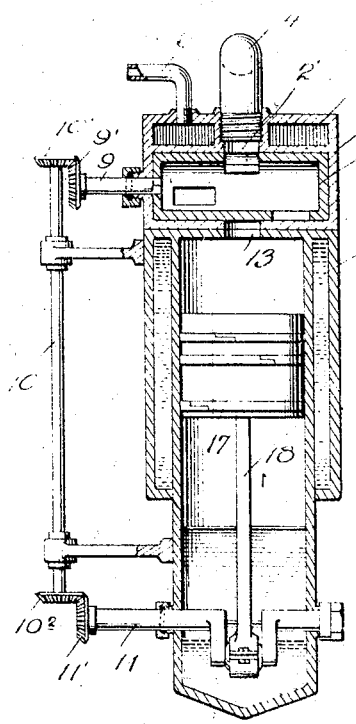
Fig. 1 is a partial vertical section taken through an internal combustion engine equipped with my invention.

As shown in Figs. 2 and 11, the numeral 12 indicates the exhaust pipe of the engine, which leads into the valve casing, and Figs. 1 and 2 show the cylinder port 13, leading into the valve casing.

My rotary valve 1 is of course a true cylinder having closed ends, and adapted to fit within the casing 2. The valve is provided with peripheral ports describing arcs of the circle defined by the wall of the valve, such ports being clearly illustrated in Figs. 3 to 10 inclusive. The intake port for the valve is indicated by the numeral 14, the cylinder valve port by the numeral 15 and exhaust valve port by the numeral 19. In the drawings 16 is the intake manifold, 17 is the piston, and 18 the connecting rod for the piston. It is to be noted that the valve ports 14, 15 and 19 are each positioned in different vertical planes and in spaced relation around the valve 1, the ports 14 and 19 each describing 45 degree arcs of the circular valve, and the port 15 describing a 90 degree arc of said circle.

The valve 1 is timed to rotate in clockwise direction at one-half crank shaft speed, ninety degrees at each cycle. In the view shown in Fig. 3, the approximate position of the valve 1, during the first cycle of operation, is shown. During this cycle cylinder valve port 15 is partially closed, but still in communication with cylinder port 13, and valve intake port 14 is in communication with intake manifold 16, permitting the gas and air mixture to pass from the carburetor through the intake manifold 16 and into and through the valve 1 and into the cylinder A.

Fig. 4 shows the position of the valve at the end of the first cycle and at the beginning of the second cycle, ports 14, 15 and 19 all being closed.

Fig. 5 shows the approximate position of the valve in the casing during the second cycle, during which port 15 comes into communication with outlet port 2', and exhaust valve port 19 registers with air inlet 7, all other ports being closed against the walls of the casing 2.

Fig. 6 shows the position of the valve at the end of the second cycle and at the beginning of the third cycle. In this position cylinder valve port is wide open and in registration with air outlet 2'. All other ports are closed against the walls of the casing 2.

Fig. 7 shows the position of the valve during the third cycle. In this position cylinder valve port 15 is partially closed but still in some communication with air outlet 2'. Intake valve port 14 is in communication with air inlet 8.

During the operations above described, currents of air pass into the funnel-shaped inlet 3, through ports 7 and 8, into and through the valve 1, driving out any excess gases which may have remained in the valve during the first cycle, and materially reducing the temperature of the valve. The current of air forced into the valve chamber proper by the engine fan and withdrawn from said chamber by the suction of the carburetor, passes out through cylinder valve port 15 and outlet 2', into and through outlet pipe 4 and to the carburetor, reaching the latter as heated air.

Fig. 8 shows the position of the valve 1 at the end of the third cycle and at the beginning of the fourth cycle, all ports being closed against the wall of the casing.

Fig. 9 shows the position of the valve during the fourth cycle, during which cylinder valve port 15 comes into communication with cylinder port 13, and exhaust valve port 19 comes into communication with exhaust port 12, permitting the burned gases to escape from the cylinder A into and through the valve chamber proper, and into the exhaust 12. All other ports are closed.

Fig. 10 shows the position of the valve at the end of the fourth cycle and at the beginning of the first cycle. In this position cylinder valve port 15 is wide open and in communication with cylinder port 3. All other ports are closed against the walls of the casing.

From the foregoing it will be observed that the ports 14, 15 and 19 in the valve 1 are so arranged, with respect to the co-operating ports 13, in the cylinder head, and the ports 7, 8 and 2', in the valve casing, and in respect to the timed rotation of the valve body, that the various cycles are automatic and certain. In the varying positions of the valve 1, the charge is taken thereinto, and delivered to the cylinder A for subsequent compression and explosion. Thereafter, the upstroke of the piston 17 occurs while the valve exhaust port 19 is in registration with the exhaust pipe 12, purging the cylinder and valve of the exhausts. Further movement of the valve 1, and while valve port 15 is partially in communication with cylinder port 13, causes valve intake port 14 to register with intake 16, permitting the gaseous mixture from the intake manifold to pass into the valve 1, and through said valve into the combustion chamber of the cylinder A, through the port 13. Under continued rotation of the valve 1, that is, during the second and third cycles, ports 19 and 14 come in registration successively with ports 7 and 8 respectively, and port 15 comes in communication with port 2', causing a blast of air to pass through the air inlet pipe 3 into and through the valve and through the pipe 4 into the carburetor, cooling and taking with it any production remaining in the valve 1.

While I have shown and described one cylinder and valve structure, it is to be understood that, in actual practice, there will be at least two cylinders, and probably more. While one cylinder is firing and exhausting another cylinder is intaking and compressing, thereby inducing a flow of cooling and scavenging air through the section of the valve affecting the cylinder which is exhausting. In other words, the intaking cylinder produces the suction in the carburetor necessary to draw the cooling and scavenging air through the valve sections affecting the other cylinders of the block.

What I claim is:

In combination with a cylinder of an internal combustion engine, a rotary valve casing adjacent and communicating with said cylinder, an air inlet leading into the casing, an exhaust port leading from the casing, a mixture inlet leading into the casing from the carbureter, and an air outlet leading from the casing to the carbureter, a rotary valve mounted in the casing, and ports in the valve so positioned that, under the rotation of the valve during the operation of the engine, an air current may pass into the air inlet through the valve and through the air outlet to the carbureter, whereby to cool and scavenge the valve.

In testimony whereof I affix my signature.

THEOPHILUS D. WERBITZKY.